(12) United States Patent
Brookey et al.

(10) Patent No.: US 7,033,977 B2
(45) Date of Patent: Apr. 25, 2006

(54) COMPOSITIONS AND METHODS FOR SEALING FORMATIONS

(75) Inventors: Tommy F. Brookey, Edmond, OK (US); Jack Cowan, Lafayette, OK (US); Mike Kilchrist, Lafayette, OK (US)

(73) Assignee: Masi Technologies, Inc., Houston, TX (US)

( * ) Notice: Subject to any disclaimer, the term of this patent is extended or adjusted under 35 U.S.C. 154(b) by 0 days.

(21) Appl. No.: 10/849,286

(22) Filed: May 19, 2004

(65) Prior Publication Data

US 2004/0211563 A1 Oct. 28, 2004

Related U.S. Application Data

(62) Division of application No. 10/135,794, filed on Apr. 30, 2002, now Pat. No. 6,739,414.

(51) Int. Cl.
C09K 7/00 (2006.01)
C09K 7/02 (2006.01)
C09K 7/06 (2006.01)

(52) U.S. Cl. .................. 507/202; 507/102; 507/103; 507/110; 507/111; 507/203; 507/212; 507/213; 507/906

(58) Field of Classification Search ............... 507/103, 507/111, 110, 203, 212, 213, 102, 202, 906; 175/72
See application file for complete search history.

(56) References Cited

U.S. PATENT DOCUMENTS

| | | | |
|---|---|---|---|
| 2,811,488 A | 10/1957 | Nestle | 507/104 |
| 2,818,230 A | 12/1957 | Davis | 255/1.8 |
| 2,944,018 A | 7/1960 | Borcherdt | 252/8.5 |
| 3,193,011 A | 7/1965 | Rickard | 166/295 |
| 3,198,252 A | 8/1965 | Walker et al. | 166/294 |
| 3,219,111 A | 11/1965 | Armentrout | 166/292 |
| 3,347,316 A | 10/1967 | Havenaar | 166/292 |
| 3,415,318 A | 12/1968 | Meijs | 166/292 |
| 3,448,800 A | 6/1969 | Parker et al. | 166/294 |
| 3,669,701 A | 6/1972 | Biederman, Jr. | |
| 3,690,106 A | 9/1972 | Tregembo et al. | 61/36 |
| 3,700,050 A | 10/1972 | Miles | 175/65 |
| 3,902,911 A | 9/1975 | Messenger | 106/97 |
| 3,907,034 A | 9/1975 | Suman, Jr. | |
| 4,010,231 A | 3/1977 | Phillips et al. | 264/35 |
| 4,155,410 A | 5/1979 | Jackson et al. | 175/66 |
| 4,212,747 A | 7/1980 | Swanson | 252/8.55 R |
| 4,234,344 A | 11/1980 | Tinsley et al. | |
| 4,369,844 A | 1/1983 | Clear | 166/294 |
| 4,450,009 A | 5/1984 | Childs et al. | 106/606 |
| 4,460,052 A | 7/1984 | Gockel | 175/72 |
| 4,461,644 A | 7/1984 | Childs et al. | 106/76 |
| 4,530,402 A | 7/1985 | Smith et al. | 166/291 |
| 4,554,032 A | 11/1985 | Hattori et al. | 149/21 |
| 4,627,926 A | 12/1986 | Pfeiffer et al. | 252/8.55 R |
| 4,813,484 A | 3/1989 | Hazlett | |
| 4,933,031 A | 6/1990 | Blomberg et al. | 106/679 |
| 4,936,384 A | 6/1990 | Sugama | 166/283 |
| 4,981,176 A | 1/1991 | Hurd | |
| 5,207,282 A | 5/1993 | Fuh et al. | 175/72 |
| 5,228,524 A | 7/1993 | Johnson et al. | 175/72 |
| 5,501,277 A | 3/1996 | Onan et al. | 166/293 |
| 5,513,712 A | 5/1996 | Sydansk | 175/69 |
| 5,706,895 A | 1/1998 | Sydansk | 166/294 |
| 5,792,727 A | 8/1998 | Jacobs | 508/113 |
| 5,826,669 A | 10/1998 | Zaleski et al. | |
| 5,881,826 A | 3/1999 | Brookey | 175/72 |
| 6,123,159 A | 9/2000 | Brookey et al. | 175/72 |
| 6,148,917 A | 11/2000 | Brookey et al. | 166/301 |
| 6,152,227 A | 11/2000 | Lawson et al. | 166/293 |
| 6,156,708 A | 12/2000 | Brookey et al. | 507/102 |
| 6,196,316 B1 | 3/2001 | Bosma et al. | 166/294 |
| 6,235,271 B1 * | 5/2001 | Luther et al. | 424/59 |
| 6,279,655 B1 | 8/2001 | Pafitis et al. | |
| 6,390,208 B1 | 5/2002 | Brookey | 175/72 |
| 6,422,326 B1 | 7/2002 | Brookey et al. | 175/72 |
| 2003/0079912 A1 * | 5/2003 | Leuchtenberg | 175/38 |

FOREIGN PATENT DOCUMENTS

WO WO 98/36151 8/1998
WO WO 00/47690 8/2000

OTHER PUBLICATIONS

Article entitled "*Foams and Biliquid Foams-Aphrons*" by Felix Sebba, Department of Chemical Engineering and Chemistry, Virginia Polytechnic Institute and State University, Blacksburg, Virginia, John Wiley & Sons Ltd., pp. 59-78, 1987.

* cited by examiner

*Primary Examiner*—Philip C. Tucker
(74) *Attorney, Agent, or Firm*—Conley Rose, P.C.

(57) ABSTRACT

The present invention generally relates to compositions of matter and methods of using those compositions. More particularly, and as part of one of the preferred embodiments, the present invention relates to compositions and methods of use of fluids useful for sealing formation fractures and/or inhibiting downhole fluid loss. The present invention is useful as a pill or series of pills that can be formulated and spotted to a particular formation zone.

18 Claims, No Drawings

COMPOSITIONS AND METHODS FOR SEALING FORMATIONS

CROSS-REFERENCE TO RELATED APPLICATIONS

This application is a divisional of U.S. patent application Ser. No. 10/135,794 filed Apr. 30, 2002, now U.S. Pat. No. 6,739,414, and hereby incorporated herein by reference.

STATEMENT REGARDING FEDERALLY SPONSORED RESEARCH OR DEVELOPMENT

Not applicable.

FIELD OF THE INVENTION

The present invention generally relates to compositions of matter and methods of using those compositions. More particularly, some of the embodiments of the present invention relate to compositions and methods of use for fluids useful in various downhole operations. Still more particularly and as part of one of the preferred embodiments, the present invention relates to compositions and methods of use of fluids useful as downhole pills for sealing formation fractures and/or inhibiting downhole fluid loss.

BACKGROUND OF THE INVENTION

A significant problem associated with downhole drilling (e.g., drilling wells for hydrocarbons production) is the loss of downhole circulation fluid (sometimes referred to as "bulk fluid") into the formation. This phenomenon is commonly called lost circulation. Lost circulation may occur when the differential pressure of the hydrostatic column is greater than formation pressure.

The need has increased to drill across zones that are not only low pressure, but highly fractured or permeable. The exposure of numerous fractures or openings having low formation pressures has increased the problem of lost circulation and formation invasion. The openings in the formation are able to accept and store drilling fluid so that little to none is returned to the surface for recirculation. This loss of fluid can become an expensive and dangerous problem. Lost circulation can lead to hole instability, stuck drill pipe, and loss of well control. At the least, it can halt drilling operations and requires expensive replacement of the lost fluid.

In addition to the fluid volume being lost, expensive lost circulation materials (LCM) are required in order to prevent continuous loss. LCM materials have heretofore comprised fibrous, granular, or flake materials such as cane fibers, wood fibers, cottonseed hulls, nut hulls, mica, cellophane, and many other materials. These LCM materials are added to the fluid system so that they may be carried into the loss zone and lodge in and around the formation. These LCM materials are typically added to the zone in the form of a pill. Pills are well known in the art and are typically small amounts of fluid relative to the bulk circulating fluid, i.e., fluid circulating within the drillstring and annulus. Pills are spotted or circulated in a wellbore and are prepared for a variety of functions including enhancement of the properties of the bulk fluid, performance of a specific task that the bulk fluid cannot perform, or a combination thereof.

LCM materials described above have several problems. They can be damaging to the formation zones. Also, solids (drill cuttings and the like) present in the LCM fluids cannot be removed with any of the known or available equipment, i.e., shaker screens, cyclones, etc., at least not in an economical manner. Thus, the fluids generally have to bypass the solids removal mechanisms. Further, the current LCM materials do not plug rapidly in many instances and have to be circulated numerous times through a fractured zone. This results in continuous increase of solids buildup and ultimately a fluid system containing a high concentration of solids.

Another type of lost circulation control technique has been developed in part due to the problems mentioned above and in part due to the increase in underbalanced drilling. Some of the underbalanced drilling techniques include the use of air, mist, and foam drilling fluids. Methods of correcting lost circulation of drilling fluids by aerating the drilling fluids are set forth in U.S. Pat. No. 2,818,230 (Davis) and U.S. Pat. No. 4,155,410 (Jackson). Problems with these fluids include hole cleaning, control of formation fluids, corrosion, and requirements for expensive, often hard to get equipment such as compressors and boosters.

In addition, although some LCM fluids are suitable for plugging the formation fractures and preventing the loss of circulation fluid, in severe loss zones even these fluids have difficulty sealing or plugging the fractures before a significant amount of expensive fluid is lost into the formation. These severe loss zones are typically large fractures in terms of physical opening size and/or in terms of total volume of the fracture. For example, large fractures are considered 10 µm or greater at their smallest opening. Many fractures are several inches or greater and some are sometimes associated with small caves typically called vugs. Even when the smallest opening is near the 10 µm level, the overall fracture may be several inches to several feet tall and several feet to several miles in length. Thus, many of the current LCM drilling fluid compositions may not be able to seal the fracture fast enough to prevent excessive loss.

In light of the deficiencies of the prior LCM materials, there is still a great need for fluids that can rapidly seal formation fractures and/or inhibit the excessive loss of drilling fluids.

SUMMARY OF THE INVENTION

In accordance with the spirit of the present invention, novel fluids comprising particulate or particulate like matter are prepared as LCM compositions that assist in the effective sealing of the formation, including large fractures. The novel LCM compositions preferably work in connection with a bulk fluid system that contains sealants, such as aphrons or particulate bridging agents. Aphron fluid systems are described in U.S. Pat. Nos. 5,881,826, 6,123,159, 6,148,917 and 6,156,708 and PCT WO 98/36151, all of which are hereby incorporated by reference. The novel compositions contribute to the creation of a tortuous bed within a formation fracture by assisting in the deliquification of the fluid within the formation fracture and effectively depositing a larger proportion of solid material from the LCM composition into the formation fracture. The tortuous bed allows the aphrons and/or other sealing materials from the bulk circulating fluid or secondary fluid to be more effective in sealing the fractures.

Several embodiments are disclosed as being illustrative of the spirit of the invention. For example, in several preferred embodiments, the fluid composition comprises hollow particles, aggregate material or mixtures thereof in concentrations high enough to viscosify the fluid. In a preferred embodiment, these fluid compositions further comprise an additive, such as a viscosifier or dilatant agent, designed to increase the fluids sealing capabilities or to enhance the qualities of the fluid or both. In addition, another preferred embodiment comprises LCM pill compositions that have increased concentrations of bulk bridging material, particularly aphrons.

Also provided herein are methods of using the above mentioned embodiments. For example, LCM pills or a series of pills are preferably spotted in the desired fracture zones. The LCM pills are delivered to the fracture zones and allowed to sit for a specified period of time. The pill fluid enters the formation fractures, deliquifys and forms a tortuous bed. As pressure is reapplied, i.e., the column is circulated through the drillstring and annulus, the remaining pill fluid is returned to the surface for separation and may be incorporated into the bulk drilling or servicing fluid.

These and other embodiments of the present invention, as well as their features and advantages will become apparent with reference to the following detailed description.

BRIEF DESCRIPTION OF THE DRAWINGS

Not applicable.

DETAILED DESCRIPTION OF THE PREFERRED EMBODIMENTS

The present invention generally relates to compositions of matter and methods of using those compositions. In particular and as part of one of the preferred embodiments, the present invention relates to compositions and methods of use of fluids useful for sealing formation fractures and/or inhibiting downhole fluid loss. The compositions of the present invention can be used as a pill or series of pills, which are formulated and spotted to a particular formation zone. As described above, pills are relatively small amounts of fluid placed or circulated in a wellbore. Pills are prepared for a variety of functions including enhancement of the properties of the bulk fluid, performance of a specific task that the bulk fluid cannot perform, or a combination thereof. The particular pills described herein are commonly called lost circulation material pills ("LCM pills").

The present invention is primarily described herein as a pill or series of pills with the understanding that the present disclosure is merely an exemplification of the principles of the invention, and is not intended to limit the invention to that illustrated and described herein. The present invention is susceptible to embodiments of different forms or order and should not be interpreted to be limited to the particular compositions or methods of use contained herein. In particular, it is wholly within the scope and spirit of the invention for the detailed compositions disclosed herein to be used in the base compositions in the bulk fluid that is circulated in the column while drilling, logging, workover, servicing, or any other downhole operation is occurring. Thus, it should be appreciated that the compositions, form of the compositions, and methods of use for the compositions provided herein are only for the sake of clarity and in the interest of presenting the more preferred embodiments of the present invention.

As stated above, the present invention is generally directed towards compositions of fluids that are capable of sealing or assisting in the sealing of formation fractures and/or inhibiting the loss of circulation fluid; Although many detailed embodiments of the present invention will be discussed herein, the fundamental idea is to provide a fluid composition that is capable of assisting in the effective sealing and even rapid sealing of the formation, including sealing in high fracture or large fracture zones. There are a couple of mechanisms by which this may be accomplished in accordance with the present invention. Some of the embodiments relate to novel LCM pill compositions that create tortuous beds within a formation fracture so that the sealing mechanisms in the bulk circulating fluid, for example, aphrons or particulate bridging and fluid loss control agents, can be more effective. Second, some of the embodiments relate to novel LCM pill compositions that can quickly seal a formation fracture without reliance on the bulk circulating fluid. These two mechanisms are not exhaustive nor are they exclusive, i.e., both may be at play in a single pill. For example, at least one embodiment of the present invention provides LCM pill compositions with multiple components such that one component creates a tortuous bed within a fracture while a second component seals the tortuous bed within the fracture.

In addition, although they can be used in any type of fracture, the compositions and methods described herein have the advantage of being "production friendly." As a result, the compositions and methods of the present invention do not create catastrophic damage to the formation within the production zones. Thus, production can be accomplished with little to no deliberate destruction or degradation of the seals. For example, in some instances, the seals are proppant like or are self-degrading. The tortuous beds and resulting seals described herein preferably have a conductivity equal to or greater than sand.

Because many of the embodiments described herein can be considered as additives that enhance the sealing effects of bulk fluid systems, it is useful to provide a description regarding a bulk fluid system that has sealing materials, for example, aphrons in drilling fluid. Again, it is emphasized and intended that compositions in accordance with the present invention are not limited in any way to a particular bulk fluid composition or particular sealing or bridging material contained therein. The description of the aphron containing fluid is provided for the sake of clarity and as an illustration of the spirit of the invention. However, an aphron containing bulk fluid system is considered one of the preferred embodiments in connection with the novel compositions and methods.

Fluid systems containing aphrons are described in the patents and published applications noted above. In general, an aphron containing drilling fluid combines the use of low shear rate viscosity generating viscosifiers with surfactants to form aphrons. The aphrons can be obtained, for example, by incorporating (1) an aphron-generating surfactant into the fluid and thereafter generating the aphrons in the fluid or (2) generating the aphrons in a liquid compatible with the fluid and mixing the two fluids together. The book by Felix Sebba entitled "Foams and Biliquid Foams—Aphrons," John Wiley & Sons, 1987, incorporated herein by reference, is an excellent source on the preparation and properties of aphrons, i.e., microbubbles.

An aphron is typically made up of a spherical core or internal phase, which is usually gas encapsulated in a thin shell. This shell contains surfactant molecules positioned so that they produce an effective barrier against coalescence with adjacent aphrons. If necessary, air or other gas can be incorporated into the fluid to entrain more gas for forming aphrons. The gas may be any gas, which is not appreciably soluble in the liquid phase of the fluid. Thus, the gas may be air, nitrogen, carbon dioxide, organic gases, and the like, including air encapsulated in the fluid during mixing. The aphrons can be generated by any means known in the art. For example, the book by Felix Sebba mentioned above describes aphron generation.

The two major components for creating stable aphrons are surfactants and viscosifiers. The surfactant is responsible for the formation of the aphrons' unique layers. An aphron-generating surfactant must be compatible with the base liquid and the viscosifier therein such that the low shear rate viscosity of the fluid can be maintained. The surfactant may also have one or more stabilizers incorporated therein. The aphron-generating surfactant may be anionic, non-ionic, or cationic depending on compatibility with the viscosifier. Preferred anionic surfactants are alkyl sulfates, alpha olefin sulfonates, alkyl (alcohol) ether sulfates, refined petroleum sulfonates, and mixtures thereof. Preferred non-ionic surfactants are ethoxylated alcohols and amine oxides. Flourocarbon based surfactants are preferred for non-aqueous fluid systems. Many specific suitable surfactants are listed in U.S. Pat. No. 6,148,917, already incorporated herein by reference.

Generally, stable aphron containing fluids are obtained by increasing the low shear rate viscosity ("LSRV") of the fluid to at least 10,000 centipoise, preferably at least 20,000 centipoise, and more preferably to at least 40,000 centipoise. Because the stability of the aphrons is enhanced as the LSRV increases, a LSRV of several hundred thousand centipoise may be desired. This is accomplished with appropriate viscosifiers. Any viscosifier that enhances the viscosity of the liquid phase surrounding the aphrons will enhance their stability. In general, suitable viscosifiers can be organic polymers, inorganic polymers, dispersed clays, dispersed minerals, mixed metal hydroxides, biopolymers, water soluble polymers, non-aqueous type polymers and mixtures thereof. Many suitable viscosifiers are listed in U.S. Pat. Nos. 5,881,826, 6,123,159, 6,148,917 and 6,156,708 and PCT/US98/02566, already incorporated herein by reference.

Aphrons in bulk fluids are useful in bridging and sealing formation fractures. During drilling, the aphrons are compressed due to the excess pressure of the column, and the aphrons enter the formation fractures. The pressure is less within the fractures allowing the aphrons to expand. The expansion of the aphrons, coupled with their aggregation within the fracture, can effectively fill and seal the fracture. These concepts are fully discussed in the above-referenced U.S. patents and published applications concerning aphrons.

The present invention can be useful as part of a LCM pill composition or as a sealant enhancement composition for bulk fluids. In either event, the present invention is intended to help prevent the loss of circulating fluid into the formation. The present invention is not limited to any particular formation zone. The embodiments of the invention can be useful for promoting sealing of all types of formation zones where fluid can be lost. For example, the present invention can be useful in sealing or enhancing sealing of formation fractures. As noted above, formation fractures vary in size and shape from microscopic to small caves. For smaller fractures, i.e., about 10 μm or less, normal drilling fluid sealants can be effective, but the present invention may be used as an enhancement to strengthen, stabilize or reduce the time necessary to build the plug. For larger fractures, i.e., about 10 μm or greater, the present invention can be used as a means of creating a tortuous bed against which the normal bulk fluid sealants can produce a seal. Alternatively, even for larger fractures, the compositions of the present invention may effectively seal formation without the assistance of the sealants in the bulk fluid system.

In one embodiment of the present invention, a LCM pill composition comprises lightweight particulates suspended in a liquid and sent to the formation fracture zone through either a pumping or spotting technique. The LCM pill should readily deliquify within the formation fractures. In a preferred embodiment, the pill is comprised of a concentration of hollow particles in an aqueous, oleaginous or otherwise non-aqueous based fluid depending on the bulk fluid composition and/or the downhole application. One such hollow particle is an inert, naturally occurring material commonly known as fly-ash. Although it is not absolute that the particles be hollow, i.e., any low density small particles that will readily deliquify will suffice, it is believed that hollow particles in addition to their inherent low density tend to have better crush strength than low-density solid particles. The preferred density of the hollow particles is from about 0.3 to about 0.9. In instances where the pressure of the production zone is high, higher density, i.e., hollow particles having a density of greater than or equal to 0.9 particles are preferred. The more critical feature of these particles is their shape or surface characteristics. The hollow particles have smoother surfaces than the aggregate particles described below. In addition, the hollow particles should have a sphericity of 0.5 or greater and a roundness of 0.3 or greater according to the Krumbein and Shoss chart for visual estimation of roundness and sphericity. In a more preferred embodiment the particles will have a sphericity and roundness of 0.9 or greater. With the foregoing description in mind, the hollow particles are sometimes referred to below as hollow spherical particles.

The pill composition containing the hollow particles enters the formation fractures and deliquifys creating a tortuous bed. The hollow particles enhance the ability of the pill to deliquify inside the fracture. In some instances, the hollow particles will seal the formation fractures on their own. However, generally the present invention is intended as an enhancement to the bulk fluid by contributing to the creation of a tortuous bed. In other words, sealing materials in the bulk circulation fluid can then more effectively bridge and seal the fracture. In the case of a bulk fluid that contains aphrons, the aphrons will more readily bridge and seal as they agglomerate in the recesses and surfaces of the newly formed tortuous bed.

In a more preferred embodiment, the hollow particles are chemically treated to give them a more hydrophobic character on their outer surfaces. Hydrophobic surfaces are more attractive to aphrons due to the unique structure of the aphron outer shell. Basically, the outermost surface of the outermost shell of an aphron is comprised of the hydrophobic heads of the surfactant molecules. Thus, a hydrophobic surface would physically attract the aphron. The same mechanism is discussed in the article incorporated herein and previously referenced by Felix Sebba in terms of the aphrons attracting and being covered by oil droplets.

There are several advantages to using a pill comprising hollow particles. The hollow particles allow the pill to have a low density, which can reduce hydrostatic in under balanced or near-balanced application. Further, the low density of the pill does not aggravate the loss of circulation fluid like traditionally heavier pills or fluids. Another advantage of these particles is that they are small, smooth and somewhat spherical. The preferred size distribution for these particles is from about 10 to about 350 μm. As such, they can be "filtered" at the surface using known techniques, such as cyclones, etc., thereby preventing the need to bypass the solids removal mechanisms and preventing the ultimate buildup of solids within the fluid. These properties make them ideal for high angle or lateral well applications. Further, the spherical nature of the particles acts like a lubricating bead, providing a "roller bearing" effect. This results in standoff from the wall and reduction in cake surface area, dramatically reducing adherence to the wallcake, lowering torque, drag and wallsticking tendencies. In addition, the spherical nature of the particles provides for better conductivity during production of the well. The more spherical the particles the greater these advantages become.

Because the particles have a low density they will tend to float in most fluids. Thus, it is critical to keep the particles adequately mixed or agitated during preparation and localized in the pill while traveling through the drillstring and prior to deliquifying in the formation fracture zone. Mixing and agitation is accomplished through any means known in the art. Localization can be accomplished with spacers if necessary but spacers are not considered critical to the present invention.

In addition, pumpability can be a problem for delivering the composition downhole to the formation fracture zone. It has been found that by making the pill in a diluted form the compositions are easily pumped and can resist deliquifying until excessive force is deliberately applied when the pill reaches the formation zone. The fluid should still contain adequate solids to allow it to set and readily deliquify in the zone. Hollow particles according to the present invention are preferably used in concentrations of about 5 to about 80% by volume. In a LCM pill composition, the hollow particles are preferably used in concentrations of from about 20 to about 50 percent by volume. However, the hollow particles can also be used in a bulk fluid. In a bulk drilling fluid, these hollow particles are preferably used in concentrations of from about 5 to about 30 percent by volume. Concentrations will be dependent on many factors, including: the severity of the bulk fluid loss, i.e., how quickly sealing is needed, the nature of the production zone, and whether any water sensitive clays or shales are present. In most cases the sealing of the fractures is rapid once deliquifying occurs.

In addition to or in place of agitation or mixing and/or dilution, an additive can be incorporated into the LCM pill that provides additional stability to the hollow particles. Additives can help maintain pumpability and uniformity of the hollow particles in the fluid. The more preferred additives are viscosifiers. Suitable viscosifiers are limited only by their compatibility with the base fluid and the hollow particles and should exhibit LSRV and/or suspension properties. For example, in aqueous based fluids, any water-soluble viscosifier would suffice. In a preferred embodiment, a LSRV biopolymer is added at about 0.5 to about 2.0 pounds per barrel ("ppb") to a pill containing 65–90 lb/bbl ceramic hollow particles. The preferred biopolymers according to the present invention comprise a xanthan gum.

Additionally, a dilatant LCM pill in accordance with the present invention can be used to increase viscosity and seal the fracture. In general, a dilatant LCM pill comprises a dilatant additive to the bulk fluid. Dilatant fluids are known in the art. However, they have traditionally been considered undesirable in drilling applications due to their dilatant behavior. For example, traditional dilatant fluids cannot be filtered by common means, such as shakers, used in drilling applications. Also, during drilling the pressure is abated intermittently, for example, during addition of new pipe to the drill string. During this period, dilatant fluids when not under pressure (stress) cannot keep the cuttings suspended in the annulus. Further, dilatant fluids have to be pumped at a very slow or low pressure pace, otherwise the stress will promote their dilatant behavior. It has been discovered that by diluting the fluid, it can be pumped and spotted efficiently to a particular formation zone. Once the fluid enters the formation and begins to deliquify, the dilatant behavior is enhanced and increased pressure or stress causes the dilatant fluid to assist in sealing the formation.

It has been found that by incorporating certain particles, including but not limited to the hollow particles and aggregate material disclosed herein, into a dilute dilatant fluid that many of the traditional problems are solved and the resulting fluid produces an excellent composition for assisting in the creation of a tortuous bed and ultimately the sealing of the formation. Accordingly, another embodiment of the present invention comprises a fluid comprising a dilatant additive, hollow and/or aggregate particles. As mentioned previously, by diluting the fluid the pumpability is greatly enhanced. It is only necessary to maintain enough particles and dilatant additive so that upon deliquifying within a fracture the desired dilatant character of the fluid can be achieved. Typically, the hollow and/or aggregate particles will be from about 5 to about 30 percent by volume of the total fluid and the dilatant additive will be from about 20 to about 500 ppb. In addition, the particles have been found to greatly enhance the pumpability and promote deliquifying within the fracture zones.

The present invention is not limited to any particular dilatant additives or polymers. However, the more preferred dilatant additives are ungelatinized starch, sulfonated polymers, cellulose containing polymers, polyvinyl alcohol, bituminous coal, and the like, including mixtures thereof.

Like the fluid compositions discussed above comprising hollow particles, the dilatant fluids enter the formation and deliquify contributing to the creation of a tortuous bed because of their enhanced ability to deliquify inside the fracture and their inherent dilatant qualities. In some instances the dilatant fluids will seal the formation fractures on their own. However, generally the present invention is intended as an enhancement to the bulk fluid. In other words, the sealing materials in the bulk circulation fluid can then more effectively bridge and seal the fracture. In the case of a bulk fluid that contains aphrons, the aphrons will more readily bridge and seal as they agglomerate in the recesses and surfaces of the newly formed tortuous bed. With time, the dilatant material degrades and is replaced with aphrons or other sealing material from the bulk fluid, leaving a seal with good conductivity for production.

In another embodiment of the present invention, a LCM pill composition is comprised of a high concentration of aggregate material. The aggregate is different from the hollow particles in that the aggregate particles do not have a substantially uniform surface, are not smooth in texture, and may comprise a much larger size distribution of approximately about 50 microns to about 0.25 inches. The aggregate particles have rough irregular surfaces allowing them to more aggressively form a tortuous bed in the formation fractures. As a result, these irregular particles may aggregate more quickly than smoother particles. In addition, the aggregate particles can have a broad density range from low-density material to a density of greater than or equal to 1. The aggregate particles may be hollow or solid. The density of the particle will be selected based on the application.

The spirit of the invention is the same in this embodiment, in that, the aggregate particles enter the formation fractures and deliquify, which creates a tortuous bed because of the aggregate particles' enhanced ability to deliquify inside the fracture. In some instances the irregular particles will seal the formation fractures on their own.

The irregular particles are preferably used as an enhancement to the sealing materials in the bulk fluid, particularly, bulk fluids containing aphrons. In other words, the sealing materials in the bulk circulation fluid can more effectively bridge and seal the tortuous bed thus sealing the fracture. In the case of a bulk fluid that contains aphrons, the aphrons will more readily bridge and seal as they agglomerate in the recesses and surfaces of the newly formed tortuous bed.

The advantage to the aggregate particles is that they can work more quickly than the smoother hollow particles described above and due to their size range can more aggressively target larger fractures. The aggregate particles are not limited to any particular composition of matter. The more preferred class of particles comprises particles that form a cementitious matrix. In particular, a preferred particle is formed from calcium silicate.

One potential drawback to these angular particles is their aggressive nature in plugging the formation fractures. Thus, a plug entirely of aggregate may have a poorer conductivity than more uniformly shaped particles, especially those with smoother more rounded surfaces. To overcome this potential problem, another preferred embodiment comprises incorporating both the hollow spherical particles and the aggregate particles in a fluid composition. This composition provides the fluid with the aggressive plugging capability of the irregular particles but maintains good conductivity in the final plug via the hollow spherical particles. The percentages of each component are not critical and would be dependent upon the nature of the formation fractures, the type of formation, the nature of the payzone, the bulk fluid if used as a pill, and various other considerations.

The cementitious aggregate particles are conducive to surface treatments that create alkaline surfaces. This is an advantage, in that, by treating the aggregate material using techniques well known by those of ordinary skill in the art, the pH of the fluid can be controlled. In order to maintain a particularly high LSRV the fluid should preferably maintain a pH of 9.5 or greater. A pH of 10 and greater is even more preferred. Loss of LSRV can have effects on certain components either in the pill or bulk fluid, such as aphron stability. Thus, in another embodiment of the present invention the aggregate particles are treated to create alkaline surfaces.

As stated above, certain embodiments according to the present invention are designed to create a tortuous bed within a formation fracture so that the bulk bridging material, for example, aphrons, in the circulating fluid can more effectively seal the bed, hence the fracture and prevent further fluid loss. The concentration of the bulk bridging material, however, may still not be high enough to bridge particularly large fractures within a desired amount of time. Accordingly, one of the preferred embodiments of the present invention comprises LCM pill compositions that have increased concentrations of bulk bridging material, preferably aphrons. These fluids provide a sufficient amount of bulk bridging material for rapid sealing in a concentrated LCM pill. In the case of bulk fluid systems containing aphrons, the normal concentration of aphrons in the bulk fluid is typically less than 20 percent by volume. In the present invention, the concentrated LCM pill fluids comprise from about 20 to about 50 percent aphrons. This increase in concentration of aphrons will provide the bridging necessary for extreme fractures and is still within the pumpable limits for drilling fluid systems. The pumpable limits for spotting pills are different than those for drilling, since pump cavitation is kept to a minimum due to the relatively small amount of the pill fluid as compared with the entire column. Further, some pump cavitation is tolerated due to the temporary nature of the spotting process. In addition, much higher concentrations of aphrons can be used with spotting pills since recirculation is not required.

The high concentration compositions described above can be applied or used in a variety of ways. For example, the high concentration compositions can be incorporated into the LCM pill itself. In other words, a LCM pill with hollow spherical particles or aggregate particles could also incorporate a high concentration of aphrons. Thus, the LCM pill would have all of the components necessary to fully seal the formation within one pill. Alternatively, the high concentration composition may comprise its own pill. As an independent and separate LCM pill, the composition may (1) simply act to seal a formation on its own by providing an adequate amount of sealant to the targeted zone, or (2) be sent as an additional pill prior or subsequent to a second LCM pill. The second LCM pill may be of the same or differing composition. Finally, the high concentration compositions may be incorporated directly into the bulk fluid used to displace a LCM pill.

Also provided herein are methods of using the above mentioned compositions. The scope of the invention contemplates no particular method or order for delivering the compositions of the present invention, with the exception of the concentrated aphron pill, to the targeted formation fracture zones. However, several methods are preferred. In one preferred method, compositions in accordance with the present invention, particularly those compositions comprising hollow spherical particles and/or aggregate particles, are used and introduced to the formation fracture zones as part of the bulk drilling or servicing fluid. In locations where the formation is extremely fractured the ability to use the present invention as a bulk fluid may be preferred over pills so that fractures can be continuously and quickly sealed as drilling progresses. The fluid is prepared at the surface and circulated through the drillstring, out the drill bit and recirculated back to the surface through the annulus using techniques that are well known by those of ordinary skill in the art. The fluid enters the formation fractures, deliquifys and contributes to the creation of a tortuous bed of spherical particles and/or aggregates within the fracture such that the bulk fluid sealing material is enhanced and more quickly able to seal the fracture. The particles deposited within the fractures form tortuous beds. Regardless of the mechanism, the fractures now contain new surfaces created by the deposited particles that enhance the bridging capabilities of the bulk fluid sealing material, for example, aphrons.

In a more preferred method, rapid fracture sealing compositions in accordance with the present invention are incorporated into LCM pills. The LCM pills are either pumped or spotted, but are preferably spotted, and sometimes squeezed in the desired fracture zone. Spotting generally means that the LCM pill is delivered to the fracture zone and allowed to sit there for a specified period of time sufficient for the pill to begin to soak into the formation. Squeezing means that once the pill is spotted in the zone, additional pressure is applied to enhance the firm placement of the pill. The pill fluid enters the formation fractures. The fluid deliquifys within the fracture either on its own or as stress is reapplied to the hydrostatic column. As pressure is reapplied, for example, as the column is circulated through the drillstring and annulus, the remaining pill fluid is returned to the surface and preferably incorporated into the bulk drilling or servicing fluid. Regardless of the pill composition or concentration of aphrons, the overall composition or concentration within the bulk fluid will not be significantly altered.

Pills are typically between 25–50 bbl whereas the total column will typically be 850 bbl or greater. In addition, most of the aphrons or other sealants will be in the fractures leaving little to be incorporated into the bulk fluid.

In another embodiment of the present invention, a series of LCM pills are sent to the desired formation fracture zone. For example, a LCM pill comprising hollow shperical particles and an appropriate viscosifier are introduced into the wellbore followed by a high concentration aphron pill. The result is that the fluid containing the hollow particles will deliquify quickly in the fracture zone and create a tortuous bed within the fractures. In accordance with the spirit of the invention, the high concentration aphron pill will then introduce a sufficient amount of aphrons into the tortuous fractures to rapidly seal the formation. As the column circulates, the remains of both pills will be incorporated into the bulk fluid.

While preferred embodiments of this invention have been shown and described, modification thereof can be made by one skilled in the art without departing from the spirit or teaching of this invention. The embodiments described herein are exemplary only and are not limiting. Many variations and modifications of the compositions and methods are possible and are within the scope of this invention. For example, it is completely within the spirit and scope of the present invention for the various fluid compositions described herein to be mixtures of each other. In particular, but not limited to, preformed aphrons can be incorporated into any of the fluid compositions, hollow spherical particles can be incorporated into fluids with aggregate material and preformed aphrons, surface treatments, i.e., hydrophobic and alkaline, can be performed on any particles surface that is eligible for such treatments and dilatant additives or viscosifiers can be added to any of the fluids. Accordingly, the scope of protection is not limited to the embodiments described herein, but is only limited by the claims, the scope of which shall include all equivalents of the subject matter of the claims.

What is claimed is:

1. A fluid system, comprising:
   a continuous liquid phase;
   a lost circulation material; and
   aphrons, wherein said lost circulation material comprises hollow particles that assist in effectively sealing a formation.

2. A fluid system according to claim 1 wherein the continuous liquid phase is selected from the group consisting of: an aqueous liquid, an oleaginous liquid and combinations thereof.

3. A fluid system according to claim 1 wherein said lost circulation material further comprises aggregate particles that assist in effectively sealing the formation.

4. A fluid system according to claim 1 wherein said lost circulation material further comprises a dilatant additive.

5. A fluid system according to claim 3 wherein the dilatant additive compnses ungelatinized starch.

6. A fluid system according to claim 1 further comprising a viscosifier.

7. A fluid system according to claim 6 wherein the viscosifier comprises a xanthan gum.

8. A fluid system according to claim 6 wherein the viscosifier comprises about 0.5 ppb to about 2.0 ppb of the fluid system.

9. A fluid system according to claim 1 wherein the hollow particles have a size distribution of about 10 to about 350 μm.

10. A fluid system according to claim 1 wherein the hollow particles comprise about 5 percent to about 80 percent by volume of the fluid system.

11. A fluid system according to claim 1 wherein the hollow particles have a density of about 0.35 to about 0.9.

12. A fluid system according to claim 1 wherein the hollow particles are spherical.

13. A fluid system according to claim 1 wherein the hollow particles have a sphericity of 0.5 or greater and a roundness of 0.3 or greater as measured by the Krumbein and Sloss chart for visual estimation of roundness and sphericity.

14. A fluid system according to claim 1 wherein the hollow particles have a density of greater than or equal to 0.9.

15. A fluid system, comprising:
   a continuous liquid phase;
   a lost circulation material; and
   aphrons, wherein said lost circulation material comprises hollow particles that
   assist in effectively sealing a formation and wherein the hollow particles have a
   size distribution of about 10 to about 350 μm.

16. A fluid system, comprising:
   a continuous liquid phase;
   a lost circulation material; and
   aphrons, wherein said lost circulation material comprises hollow particles that
   assist in effectively sealing a formation and wherein the hollow particles comprise
   about 5 percent to about 80 percent by volume of the fluid system.

17. A fluid system, comprising:
   a continuous liquid phase;
   a lost circulation material; and
   aphrons, wherein said lost circulation material comprises hollow particles that
   assist in effectively sealing a formation and wherein the hollow particles have a
   density of about 0.35 to about 0.9.

18. A fluid system, comprising:
   a continuous liquid phase;
   a lost circulation material;
   aphrons; and
   a viscosifier,
   wherein the continuous liquid phase is selected from the group consisting of: an aqueous liquid, an oleaginous liquid and combinations thereof; and
   wherein said lost circulation material comprises hollow particles that assist in effectively sealing a formation.

* * * * *